(12) United States Patent
Gao et al.

(10) Patent No.: US 9,300,448 B2
(45) Date of Patent: Mar. 29, 2016

(54) SEARCH SPACE FOR COMPONENT CARRIER SPECIFIC UL/DL CONFIGURATION (75) Inventors: Chunyan Gao, Beijing (CN); Jing Han, Beijing (CN); Erlin Zeng, Beijing (CN); Na Wei, Beijing (CN); Wei Bai, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 147 days.

(21) Appl. No.: 14/232,077

(22) PCT Filed: Jul. 12, 2011

(86) PCT No.: PCT/CN2011/077063
§ 371 (c)(1),
(2), (4) Date: Feb. 10, 2014

(87) PCT Pub. No.: WO2013/007016
PCT Pub. Date: Jan. 17, 2013

(65) Prior Publication Data
US 2014/0161082 A1    Jun. 12, 2014

(51) Int. Cl.
*H04W 72/04* (2009.01)
*H04L 5/00* (2006.01)
(Continued)

(52) U.S. Cl.
CPC .............. *H04L 5/0037* (2013.01); *H04L 5/001* (2013.01); *H04W 72/0406* (2013.01); *H04W 72/1263* (2013.01); *H04W 74/04* (2013.01)

(58) Field of Classification Search
CPC ....... H04L 5/0037; H04L 74/04; H04L 5/001; H04L 5/0064; H04L 5/14; H04L 72/0406; H04L 5/0053; H04W 72/1263; H04W 72/1278; H04W 28/12; H04W 48/12; H04W 72/042; H04W 72/1289

USPC ......... 370/329, 252, 328, 336, 279, 280, 281, 370/315; 455/509, 73, 422.1, 452.1, 68, 91, 455/450

See application file for complete search history.

(56) References Cited

U.S. PATENT DOCUMENTS 8,433,251 B2 *  4/2013  Chen et al. ...................... 455/68
8,463,262 B2 *  6/2013  Kwon et al. ................... 455/434
(Continued)

FOREIGN PATENT DOCUMENTS

CN         101699901        4/2010
CN         101790190        7/2010
(Continued)

OTHER PUBLICATIONS

R1-102741 by Qualcomm entitled Search Space and Blind Decodes for CA (3GPP TSG WAN WG1 #61; May 10-14, 2010; Montreal, Canada) 4 pages.
(Continued)

*Primary Examiner* — Edan Orgad
*Assistant Examiner* — Ivan O Latorre
(74) *Attorney, Agent, or Firm* — Oblon, McClelland, Maier & Neustadt, L.L.P.

(57) ABSTRACT

A radio frame or subframe is checked and it is determined to satisfy at least one predefined condition. In response to that determination, a second search space is utilized such that a number Y of blind detections for a user equipment UE in the determined radio frame/subframe is greater than a number X of blind detections for the UE in the radio frame/subframe if a first search space were utilized. In various embodiments the predefined condition is: the number X of blind detections is less than a threshold value Z (Z>=Y) where Z is a maximum number M of blind detections defined by a transmission mode for the frame's/subframe's component carrier CC; a number of CCs configured for the UE; the radio frame or subframe is in the first CC but not in the second CC one of uplink or a special subframe (further conditions) or an almost blank subframe.

20 Claims, 5 Drawing Sheets

(51) Int. Cl.
*H04W 72/12* (2009.01)
*H04W 74/04* (2009.01)

(56) References Cited

U.S. PATENT DOCUMENTS

2010/0254329 A1* 10/2010 Pan et al. .................. 370/329
2010/0303011 A1* 12/2010 Pan et al. .................. 370/328
2011/0105050 A1* 5/2011 Khandekar et al. ............ 455/68
2011/0292891 A1* 12/2011 Hsieh et al. ................ 370/329
2012/0257513 A1* 10/2012 Yamada .................... 370/248
2012/0263052 A1* 10/2012 Dai et al. .................. 370/252
2013/0016672 A1* 1/2013 Yang et al. ................ 370/329
2013/0203430 A1* 8/2013 Gan et al. ................... 455/450
2014/0119348 A1* 5/2014 Zhang et al. ............... 370/336

FOREIGN PATENT DOCUMENTS

CN      102056185       5/2011
WO   WO 2010/149106  * 12/2010 ............ H04W 24/10
WO      2012139291     10/2011

OTHER PUBLICATIONS

R1-103084 by Huawei entitled PDCCH Blind Decoding in LTE-A (3GPP TSG RAN WG1 #61; May 10-14, 2010; Montreal, Canada) 6 pages.

* cited by examiner

|  | CC #2(Pcell) | CC#1 |
|---|---|---|
| UE specific search space | DCI format 0/1A -> 16<br><br>DCI format 4 -> 16<br><br>DCI format 2 -> 16 | DCI format 0/1A -> 16<br><br>DCI format 4 -> 16<br><br>DCI format 2 -> 16 |
| Common search space | DCI format 0/1A -> 6<br><br>DCI format 1C -> 6 |  |
| Total in one CC | 60 | 48 |
| BDs CC1 + CC2 | 108 | |

Figure 2

|  | CC #2 (Pcell) | CC#1 |
|---|---|---|
| UE specific search space | DCI format 0/1A -> 16<br><br>DCI format 4 -> 16<br><br>DCI format 2 -> 16 | ~~DCI format 0/1A -> 16~~<br><br>~~DCI format 4 -> 16~~<br><br>~~DCI format 2 -> 16~~ |
| Common search space | DCI format 0/1A -> 6<br><br>DCI format 1C -> 6 |  |
| Total in one CC | 60 | 48 |
| BDs CC1 + CC2 | 60 | |

| | CC #2 (Pcell) <br> Old number / new number | CC#1 |
|---|---|---|
| UE specific search space | DCI format 0/1A -> 16 / 32 <br><br> DCI format 4 -> 16 / 32 <br><br> DCI format 2 -> 16 / 32 | DCI format 0/1A -> 16 <br><br> DCI format 4 -> 16 <br><br> DCI format 2 -> 16 |
| Common search space | DCI format 0/1A -> 6 <br><br> DCI format 1C -> 6 | |
| Total in one CC | 60 | 48 |
| BDs CC1 + CC2 | 60 | |

SEARCH SPACE FOR COMPONENT CARRIER SPECIFIC UL/DL CONFIGURATION

TECHNICAL FIELD

The exemplary and non-limiting embodiments of this invention relate generally to wireless communication systems, methods, devices and computer programs, and more specifically relate to defining a blind detection search space for a user equipment in a radio access technology which utilizes carrier aggregation.

BACKGROUND

The following abbreviations that may be found in the specification and/or the drawing figures are defined as follows:
3GPP third generation partnership project
CA carrier aggregation
CC component carrier
CCE control channel element
DCI downlink control information
DL downlink
eNodeB node B/base station in an E-UTRAN system
DL downlink
E-UTRAN evolved UTRAN (LTE)
HARQ hybrid automatic repeat request
LTE long term evolution (of UTRAN)
LTE-A long term evolution-advanced
PCell primary component carrier/primary cell
PDCCH physical downlink control channel
PDSCH physical downlink shared channel
PUSCH physical uplink shared channel
SCell secondary component carrier/secondary cell
SPS semi-persistent scheduling
TDD time division duplex
UE user equipment
UL uplink
UTRAN universal terrestrial radio access network The concept of carrier aggregation CA is well established in the wireless communication arts and has been undergoing development for the LTE/LTE-A systems. In CA the whole system bandwidth is carved into multiple component carriers CCs. Specific for LTE/LTE-A, each UE is to be assigned one PCell which remains active and one or more SCells which may or may not be active at any given time, depending on data volume for the UE and traffic conditions in the serving cell. At least one CC in the system is to be backward compatible with UE's which are not capable of CA operation, and the SCells may be similar to the PCell (e.g., with their own set of control channels) or what is termed extension CCs which can be utilized only in conjunction with a full CC (e.g., only traffic channels on the extension CCs). For example, the network can send a resource allocation (a PDCCH) to a UE on its PCell which allocates resources for sending/receiving data on any activated SCell, even an extension carrier. This is known as cross-scheduling (the resource allocation or schedule is communicated on a different CC than the scheduled radio resource is located), and is not limited to only the PCell and extension CCs. The LTE-A system proposes to expand this concept so that it is possible to have one or more SCells in unlicensed radio spectrum (e.g., the ISM band or TV whitespaces).

Figure 1A:
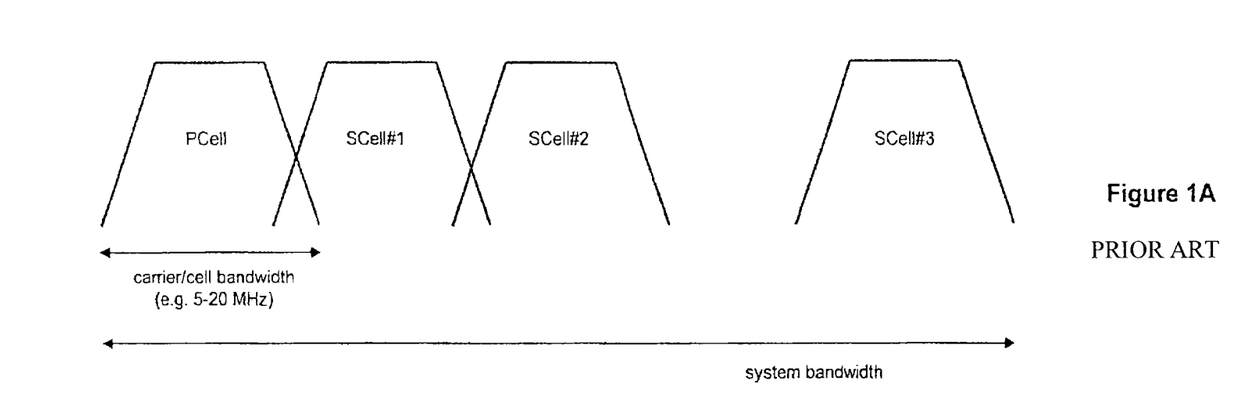
FIG. 1A is a schematic frequency diagram showing a carrier aggregation system in which some component carriers lay in a licensed band and some lay in unlicensed bands.

FIG. 1A illustrates the general CA concept for LTE/LTE-A. For a given UE there is assigned a PCell 100 which by example is backward-compatible with LTE Release 8/9 UEs (and therefore 20 MHz in bandwidth though the various CCs may be defined by different bandwidths). That same UE may also have in its assigned set SCell #1, SCell #2 and SCell #3, which for completeness SCell #3 is shown as being non-contiguous in frequency with the other CCs. Any number of the SCells or none of them may be active for that UE at any given time, as coordinated with the eNodeB. Every UE is to have its assigned PCell always active, and so legacy UEs which are not CA-capable will be assigned one backward-compatible CC and no others.

Each CC will be operating at any given moment with a specific UL/DL configuration, each configuration defining a specific order of DL and UL subframes. The eNodeB may send and the UE may receive DL control information (PDCCH, PHICH) or data (PDSCH) in a DL subframe. Correspondingly the UE may send and the eNodeB may receive UL control information (HARQ) or data (PUSCH) in a UL subframe. The UE gets is schedule of allocated DL and UL resources in a PDCCH which tells which DL and/or UL subframes are allocated for the UE's data. Each specific UL/DL configuration has a channel mapping associated with it, and relevant to these teachings there is a mapping of the UE's UL subframe in which the UE sends data in a PUSCH to a DL subframe in which the UE listens for a PHICH to confirm whether or not the eNodeB properly received and decoded its UL data.

It is expected for 3GPP Release 11 (LTE-A) that there will be the capability for cross scheduling across CCs, and also that the different CCs may have different UL/DL configurations. The latter is to support layer deployment where different CCs provide different coverage and accommodate different traffic, and also inter-band CA and co-existence with other systems in certain frequency bands.

Co-owned international patent application PCT/CN2011/072774 (filed 14 Apr. 2011) details problems that arise when there are different UL/DL configurations on two CCs that are active for a given UE. Namely, for the case that HARQ feedback is sent always on the PCell but maps from the CC on which the resource being acknowledged lies, there is the potential that the UE cannot send its HARQ feedback because the mapped subframe may be for downlink only. That co-owned application discusses a similar problem when cross-scheduling across two CCs with different UL/DL configurations.

Figure 1B:
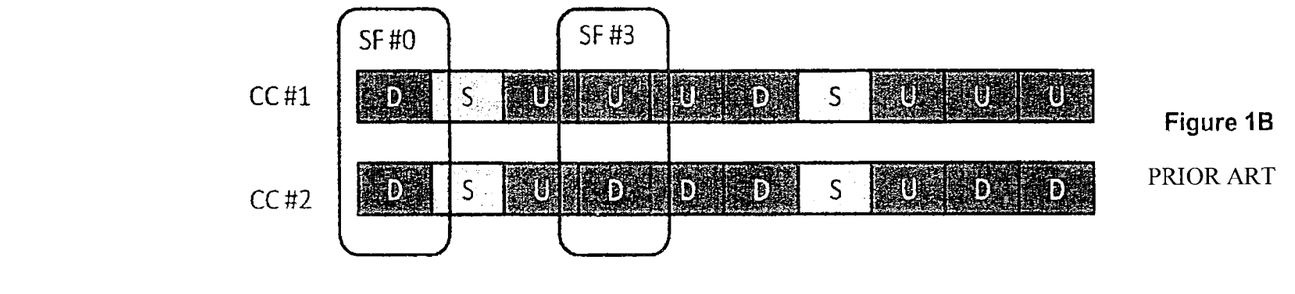
FIG. 1B is an example of two different UL/DL configurations on two different CCs and illustrating overlapping subframes which gives rise to the exemplary embodiments detailed herein.

These issues arise when there is one or more overlapped subframes in the different CCs as shown by example at FIG. 1B which assumes that there are two CCs configured for a given UE in a TDD system. CC #1 is configured in the TDD UL/DL subframe configuration #0 and CC #2 is configured in the TDD UL/DL subframe configuration #2. Subframe #3 is termed an overlapped subframe because that same subframe in one CC is UL and in the other CC it is DL.

The inventors have also found that for the case of overlapped subframes the UE's blind detection capability is not sufficiently utilized. This relates to the UE's search space, and both the problem and its solution are further detailed in the detailed description section below. To the inventors' knowledge there has been no prior solution to better utilize a UE's blind detection capability for a system with CC-specific TDD UL/DL configurations.

There are references which relate generally to search spaces and blind decoding. Specifically document R1-102741 by Qualcomm entitled SEARCH SPACE AND BLIND DECODES FOR CA (3GPP TSG RAN WG1 #61; 10-14 May 2010; Montreal, Canada) proposes that when some of the configured CCs would be deactivated, more than one search space can be used for scheduling a PDSCH/

PUSCH on a CC that is not deactivated. However this document does not appear to suggest how a UE's blind detection capability can be fully exploited when monitoring more than one search space on the activated CCs would exceed a UE's blind detection capability. This is possible for system with CC-specific TDD UL/DL configurations since even if there would be no DL grant for a CC in UL subframe, but there might be UL grant still, which means only part of the blind detection number can be "spare" for a CC in UL subframe. The same issue may exist when the two CCs would be configured with different TDD special subframe patterns. Furthermore, the suggested solution in document R1-102741 is based on the activation/deactivation status of the CCs, which may have issues such as MAC signaling reliability.

Another reference which concerns blind detection in CA is document R1-103084 by Huawei entitled PDCCH BLIND DECODING IN LTE-A (3GPP TSG RAN WG1 #61; 10-14 May 2010; Montreal, Canada). This document proposes that the eNodeB semi-statically configure the maximum number of blind detections for a UE. However, the document itself does not make clear how to use such a higher layer based configuration for systems with CC specific TDD UL-DL configurations, nor does it address the concept of overlapped subframes as noted above. Furthermore, the definition of search space in document R1-103084 does not appear able to scale with the configured number of blind detections, which means it would be difficult to adapt those teachings to at least the current PDCCH search space structure in the LTE/LTE-A systems.

Exemplary embodiments of the invention detailed below more efficiently utilize the blind detection capability of a given UE, so that in the context of overlapped subframes the PDCCH blocking probability is lower and the system throughput is increased. The latter follows because from the UE's perspective the probability of getting a scheduled PDSCH is increased which increases the downlink data rate.

SUMMARY

In a first exemplary embodiment of the invention there is an apparatus comprising a processing system including at least one processor and a memory storing a set of computer instructions. In this embodiment the processing system is arranged to: determine that a radio frame or subframe satisfies at least one predefined condition; and in response to the determination, utilize a second search space such that a number Y of blind detections for a user equipment in the determined radio frame or subframe is greater than a number X of blind detections for the user equipment in the radio frame or subframe if a first search space were utilized.

In a second exemplary embodiment of the invention there is a method comprising: determining that a radio frame or subframe satisfies at least one predefined condition; and in response to the determining, utilizing a second search space such that a number Y of blind detections for a user equipment in the determined radio frame or subframe is greater than a number X of blind detections for the user equipment in the radio frame or subframe if a first search space were utilized.

In a third exemplary embodiment of the invention there is a computer readable memory storing a set of instructions, which when executed by an apparatus causes the apparatus to: determine that a radio frame or subframe satisfies at least one predefined condition; and in response to the determination, utilize a second search space such that a number Y of blind detections for a user equipment in the determined radio frame or subframe is greater than a number X of blind detections for the user equipment in the radio frame or subframe if a first search space were utilized.

In each of the above aspects X and Y are each positive integers. These and other embodiments and aspects are detailed below with particularity.

DETAILED DESCRIPTION

In the following examples it is assumed the UE is capable of operating simultaneously on multiple CCs which have different UL/DL subframe configurations. In the LTE-A system this would be a Release-11 (or later) UE but these teachings are relevant for other radio access technologies which utilize a CA system and which also allow different UL/DL configurations on different CCs that are active for a given UE.

Figure 2:
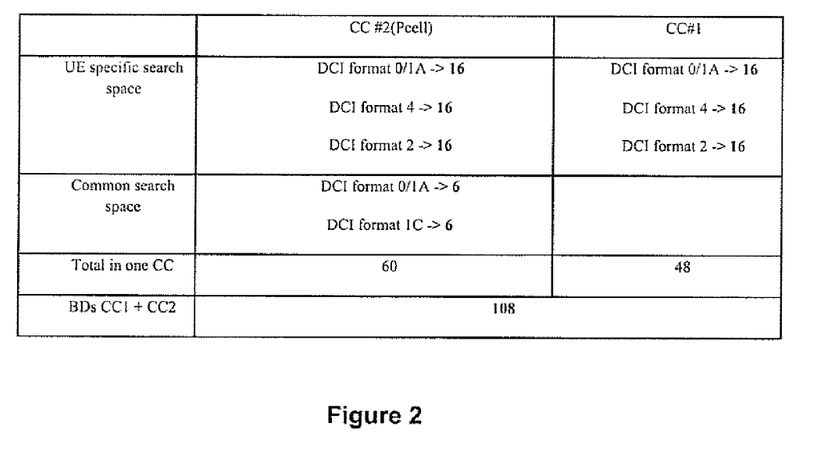
FIG. 2 is a table detailing the total number of blind detections a UE can perform in subframe #0 of the two CCs in FIG. 1B.
Figure 3:
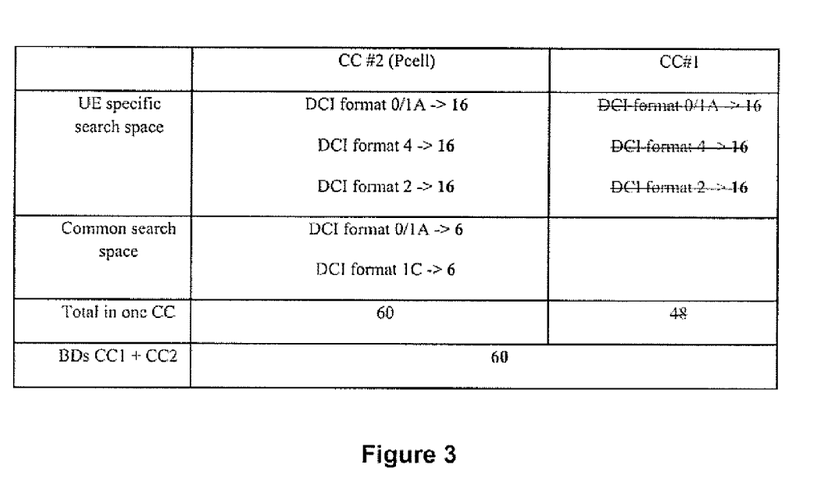
FIG. 3 is a table detailing the total number of blind detections a UE can perform in the overlapped subframe #3 of the two CCs in FIG. 1B.

Consider FIGS. 2-3 for illustrating how overlapping subframes degrade just how much of the UE's blind detection capability can be utilized. Specifically, according to the current LTE definition of a UE's PDCCH search space, the maximum blind detections will be in any case lower than N×60, where N is the (integer) number of configured CC for that UE. The exact number of blind detections depends on the transmission modes configured for the PDSCH and the PUSCH, and also on the number of configured CCs for the UE. The tables of FIGS. 2 and 3 list some possible examples of the number of blind detections in subframe #0 (FIG. 2) and subframe #3 (FIG. 3), assuming a UE is required to monitor two DCI formats for its PDSCH grant and its PUSCH grant respectively in the UE specific search space.

The data in those two figures assume that in CC #1 the HARQ timing follows the design in the existing LTE system given its TDD UL/DL configuration for that given CC, as set forth in 3GPP TS 36.213 v9.0.0. The data show that for subframe #0 which are not overlapped between the two CCs the UE can perform 60 blind detections in CC#2 and 48 blind detections in CC #1 for a total of 108 blind detections in subframe #0 across both CCs. Compare that to the overlapped subframe #3 in which the UE can still perform 60 blind detections in CC #2 but zero blind detections in CC #1. From this data it is clear that in the overlapped subframe #3 the blind detection number is much less compared to the non-overlapped subframe #0. In practice this leads to an inherent restriction on PDCCH scheduling by the eNodeB. If more blind detection candidates can be allowed but still not exceeding the UE's capability, the result would lead to a lower probability of PDCCH blocking which in the end increases the system throughput as noted in the background section above.

In practice a UE's blind detection capability is hardware dependent. But when the PDCCH search space has been specified, one can assume that an integer number M is the maximum number of blind detections, which may for example be defined by the PDSCH or PUSCH transmission mode for each CC and the number of CCs configured for that UE. This means that in all cases the number of maximum blind detections would not exceed M for any given UE.

First we introduce certain search space redefinitions and principles for such redefinitions, and under what conditions this search space re-definitions shall apply. Consider the conventional search space as defined by current 3GPP specifications as a first search space. In accordance with exemplary embodiments of these teachings the UE checks whether some predefined condition or conditions are fulfilled such that the number of PDCCH blind detections X in the subframe is less than M. If yes, the PDCCH search space is redefined as a second search space, which extends the first search space, so that the exact number of blind detections Y using the second search space is greater than X but equal or less than M.

The UE aspects of this embodiment and others below are detailed with respect to FIG. 6. At block 602 the UE determines that a radio frame or subframe satisfies at least one predefined condition. In response to the determination, at block 604 the UE utilizes a second search space such that a number Y of blind detections for the UE in the determined radio frame or subframe is greater than a number X of blind detections for the UE in the radio frame or subframe if a first search space were utilized. In this case Y is a positive integer and X is an integer greater than or equal to zero.

In various embodiments below it is the UE which determines, absent explicit signalling from the eNodeB, to apply the second search space. The eNodeB can similarly determine when the second search space will apply so it can effectively utilize that improved UE blind detection utilization, but in several of the embodiments below there does not need to be explicit signalling of which subframes the second search space will apply.

Figure 6:
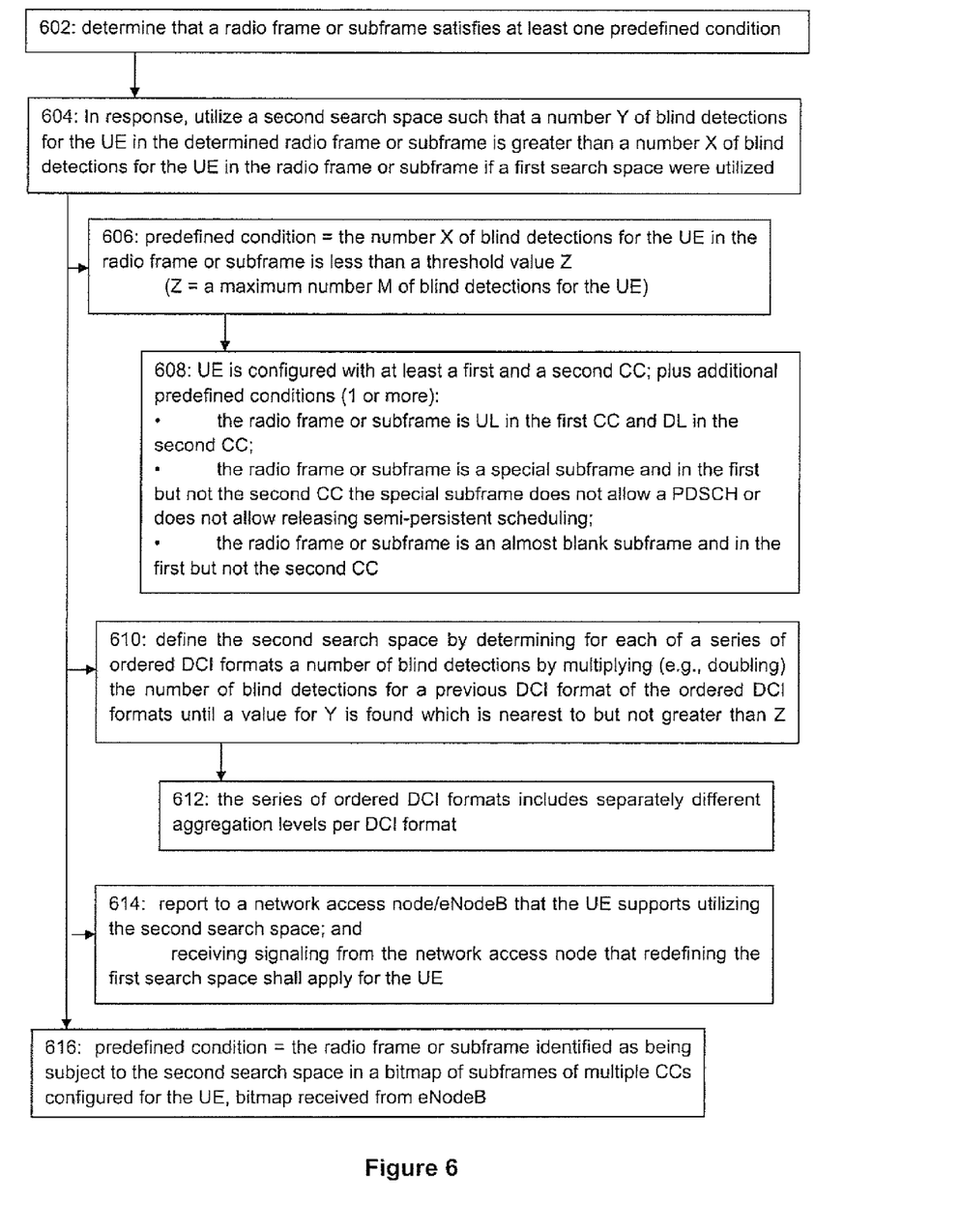
FIG. 6 is a logic flow diagram from the perspective of the UE that each illustrates the operation of a method, and a result of execution by an apparatus of a set of computer program instructions embodied on a computer readable memory, in accordance with the exemplary embodiments of this invention.

In one such embodiment detailed at block 606 of FIG. 6, the UE tests for the predefined condition on its own and the predefined condition is that the number X of blind detections for the user equipment in the radio frame or subframe is less than a threshold value Z. In a more particular embodiment the threshold value Z is a maximum number M of blind detections defined as noted above by at least one of an ULK or DL transmission mode for a CC in which the radio frame or subframe lies, and a number of CCs configured for the UE.

In more particular embodiments, block 608 of FIG. 6 sets forth some additional predefined conditions, any one or more of which can be used in conjunction with that in block 606.

The additional predefined conditions at block 608 are, for the case in which the UE is configured with at least a first and a second CC:
the radio frame or subframe is uplink in the first component carrier and downlink in the second component carrier (in a system with CC-specific TDD UL/DL configurations, when a subset of the configured CCs are in UL subframe);
the radio frame or subframe is a special subframe and in the first but not the second component carrier the special subframe does not allow a downlink shared channel or does not allow releasing semi-persistent scheduling (for example, in a TDD system with different special subframes in different configured CCs and a subset of the configured CCs requires less blind detection since it may be that the PDSCH is not allowed in the subframe, or that PDCCH releasing of semi-persistent scheduling is not allowed in the subframe); and
the radio frame or subframe is an almost blank subframe and in the first but not the second component carrier (In a case where almost blank subframe would be configured for a subset of the CCs so that in the subframe the subset of configured CCs would require less blind detection)

Almost blank subframes are known in the wireless art for LTE; they are subframes in which adjacent access nodes refrain from transmitting (with limited exceptions such as multimedia transmissions) so as not to interfere with transmissions to or from a nearby relay node to which is allocated that subframe for its own scheduling use.

Second, now consider one example of how the search space may be redefined. In one embodiment there is a predefined order for DCI formats, which is configured via higher layer. In one non-limiting example this may be in the form of [DCI format x_1, format x_2, . . . format x_N], where N is the number of DCI formats monitored by a UE.

The second (new) search space is defined by doubling (or otherwise multiplying) the number of blind detection candidates for each DCI format following the predefined order. For example, this is first done for DCI format x_1, then for format x_2, and so forth until the total number of blind detections for the UE would exceed the threshold value Z (which in an embodiment is the maximum value M) if the number of blind detection candidates is increased any further. Block 610 of FIG. 6 shows this as the UE determining for each of a series of ordered DCI formats a number of blind detections by multiplying (e.g., doubling) the number of blind detections for a previous DCI format of the ordered DCI formats until a value for Y is found which is nearest to but not greater than Z.

In an embodiment it is not only the DCI formats subject to this multiplying the number of blind detections but also the aggregation levels per DCL In this case the predefined order includes the order of different aggregation levels for a given DCI format [e.g., aggregation level one, two, four, eight]. This extends the blind detection candidates further based on that order for a given DCI format. Block 612 of FIG. 6 states this simply that the block 610 series of ordered DCI formats includes separately different aggregation levels per DCI format.

In one aspect the above embodiments may be implemented in a wireless system by making the search space extension a mandatory feature for all UEs operating in that system, such as for example by being stipulated in a wireless standard and enabling legacy UEs for this feature by a software/firmware download to their local memory. In another aspect there may be some UEs which do not have the capability to extend/redefine their search space operating in the same wireless system alongside other UEs which do have that capability. In that case there may be some signaling between the network and those UEs which are capable of extending or otherwise re-defining their search space, or alternatively the legacy UEs will signal the network that they lack this capability and the network will assume all other UEs not similarly signaling do have that capability. Below are detailed non-limiting examples of such capability signaling.

The search space definition may be determined by the UE and eNodeB without explicit signalling of which subframes it applies, but in an embodiment there is still an exchange between them to provide for an ON/OFF possibility of when the search space extension is allowed or prohibited in the network. This exchange can be on a per-UE basis to allow some UEs to use the expanded search space and to prohibit others from doing the same at any given time.

Specifically, the UE will in this exemplary but non-limiting embodiment report to the eNodeB whether or not it supports extending/re-defining its search space as detailed above. In one implementation the UE reporting its capability for cross-scheduling (from LTE Release 10) is re-used as the above report of the UE's capability to re-define its PDCCH search space. If the UE does support this search space re-definition, the eNodeB can configure via higher layer signaling whether the extended/second search space option shall apply for a given UE. This is detailed at block 614 of FIG. 6.

In other exemplary embodiments rather than the eNodeB and the UE independently determining whether the predetermined conditions are met for a given radio frame or subframe, block 616 of FIG. 6 provides that the predefined condition first mentioned at block 602 is that the radio frame or subframe is identified as being subject to the second search space in a bitmap of subframes of multiple CCs configured for the UE, in which the bitmap is received from a network access node. In this manner the eNodeB's bitmap for one or multiple CCs among all the configured CCs indicates which subframe(s) shall apply the search space extension.

FIG. 6 is a logic flow diagram which summarizes the various exemplary embodiments of the invention from the perspective of the Release-11 UE. FIG. 6 may be considered to illustrate the operation of a method, and a result of execution of a computer program stored in a computer readable memory, and a specific manner in which components of an electronic device are configured to cause that electronic device to operate, whether such an electronic device is the UE or one or more components thereof such as a modem, chipset, or the like. The various blocks shown in FIG. 6 may also be considered as a plurality of coupled logic circuit elements constructed to carry out the associated function(s), or specific result of strings of computer program code or instructions stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention. In FIG. 6 the terms $1^{st}$ and $2^{nd}$ CC are used to distinguish them from one another; either may be the PCell or they may both be SCells.

Now are described certain exemplary implementations, assuming by non-limiting example that the predetermined condition is that there is an overlapping UL and DL subframe in a given pair of a UE's configured CCs having CC-specific UL/DL configurations. This is but one of several implicit triggers for re-defining the (first) search space noted above but these implementations can also be utilized with the other implicit triggering or the explicit triggering such as the bitmap detailed above.

Consider again the example given at FIG. 1B and the blind detections given at FIGS. 2-3. From the UE's blind detection capability point of view, the UE shall be able to carry out as many as 108 blind detections in subframe #3 instead of only 60 since it can do 108 blind detections in subframe #0. The fewer number of blind detections in subframe #3 arises from the fact that in CC #1, subframe #3 is UL and so it is not possible to transmit any DL/UL grants in that subframe (or the eNodeB does not need to transmit any grants given the timing defined for CC #1). It is therefore possible to enable up to 108 blind detections in CC #2 in subframe #3. One significant advantage of enabling more blind detections in CC #2 is to reduce the PDCCH blocking rate for that UE, since for a given aggregation level L the number of allowed candidates M_L will increase.

Figure 4:
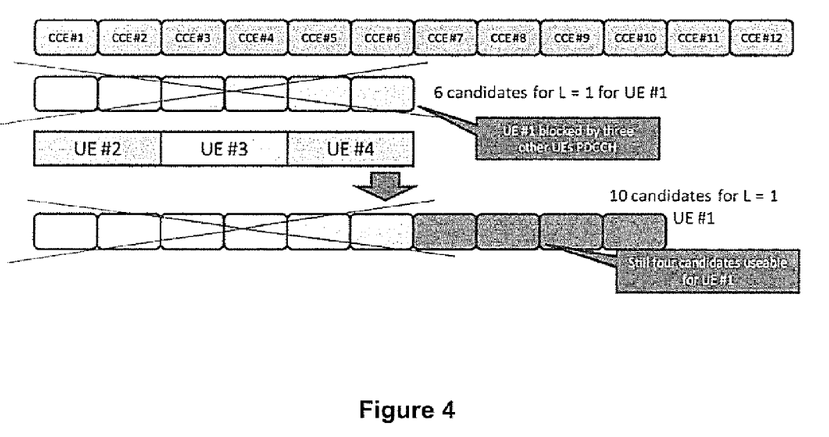
FIG. 4 is a schematic diagram showing CCEs as candidates for a UE's PDCCH which illustrates PDCCH blocking for UE #1 due to no available blind detection candidates, and a solution to reduce the probability of such blocking.

FIG. 4 illustrates how PDCCH blocking can be reduced by having more blind detection candidates available. Specifically, if some other UE #2, #3 and #4 which has PDCCHs of aggregation level two are scheduled to CCE #1 to CCE #6, then UE #1 will be blocked for aggregation level one if there are only six possible candidates as shown by the second x'd out row of FIG. 4. Each blind detection corresponds to one CCE, and in that second row all six CCEs are occupied by those other UE's PDCCH and so there is no opportunity for the eNodeB to schedule the UE #1 there. If for UE #1 we allow up to ten candidates for aggregation level 1, then it is clear there would be four possible CCEs to schedule the PDCCH for the same UE under the exact same conditions where UE #2, #3 and #4 occupy the first six CCEs. With additional blind detection possibilities the UE can read those additional CCEs. At the network level, allowing more PDCCH scheduling possibilities to the UEs will reduce the PDCCH blocking probability, thus it will provide throughput gain as compared with the case where PDCCH blocking (scheduling inefficiencies) operates as the throughput bottleneck.

Figure 5:
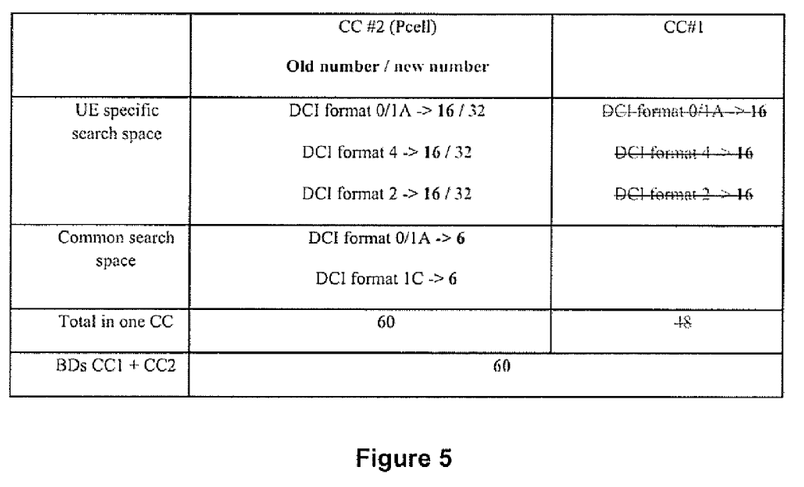
FIG. 5 is similar to FIG. 3 but showing an increased number of blind detections in CC #2 due to an expanded search space which partially or fully offset the loss of blind detection candidates in CC#1 according to an exemplary embodiment of the invention.

Now consider a specific example of defining the second search space, which is the same as the first search space but extended. Since the 48 blind detections are no longer needed in subframe #3 of CC#1, the new search space definition is so that the number of blind detection candidates for the DCI formats will be doubled as in block 620 of FIG. 6. In the table of FIG. 5, all the DCI formats in the UE specific search space have doubled blind detection candidates; they are increased from 16 to 32 for each of the DCI formats.

If in practice the total number of blind detection to increase is lower than 48 (which in this example is the number not used in CC #1), the search space redefinition can be based on a predefined order such as [DCI format 2>DCI format 4>DCI format 0/1A]. For example if the multiplication rule of block 610 in FIG. 6 provides that the blind detection candidates are doubled for only two out of the three DCI formats, then that same multiplication rule can provide that for DCI format 2 and 4 the number of blind detection candidates increases from 16 to 32, while for DCI format 0/1A the number of blind detection candidates is unchanged. One reason to implement in this fashion is because DCI format 2 is the transmission mode dependent DCI format for PDSCH transmissions while DCI format 4 is the transmission mode dependent DCI format for UL data, and format 0/1A is mainly used as a fallback mode.

As was noted above the search space redefinition can be done in practice for each aggregation level (one, two, four and eight) for a given DCI format. For block 610 of FIG. 6 this requires that an order list has to be predefined by the eNodeB for a given DCI format. For example, if it is configured for DCI format 2, the UE shall first double the blind detection candidates for aggregation level one, and then for aggregation levels two, four, and eight subsequently. One advantage in having such order list for the different aggregation levels is that in practice the probabilities of scheduling one CCE for a PDCCH would be greater than two CCEs, while the probability for scheduling eight CCEs would be the lowest among them all.

To summarize the major points above, actions taken from the UE perspective include the following:
- The UE checks if it is configured via higher layer to enable the search space redefinition.
  - if yes, the UE checks the TDD UL/DL configuration per CC, to see if the predetermined condition(s) are fulfilled.
    - If yes the new/second search space definition applies, while the old/first search space (i.e., non-extended) shall apply if the condition(s) is/are not fulfilled.
    - If the new/second search space definition applies, the UE checks the predefined DCI format order to determine the exact number of blind detection for each of the DCI formats.
- The UE will monitor the same set of DCI formats regardless of whether the redefinition is applied.
  - The DCI formats, as is conventional, depend on the configured transmission modes for PDSCH or PUSCH, but the exact number of blind detections for each DCI would be based on the above bullet in which the UE checks the TDD UL/DL configuration per CC.

To summarize the major points above from the perspective of the eNodeB, actions taken from the eNodeB perspective include the following:
- The eNodeB configures the TDD UL/DL configuration per CC.
- The eNodeB configures for each UE whether the search space redefinition is enabled.
  - if for a given UE this is enabled, the eNodeB can further configure a DCI format order for the same UE.
- The eNodeB checks if a given subframe fulfills the predetermined condition(s) described at block 604 of FIG. 6.
  - if yes, the eNodeB will schedule the PDCCH for a given UE, assuming UE applies or not apply the PDCCH search space redefinition according to the UE procedure described above.

Since the TDD UL/DL configuration per CC is known by the eNodeB and the UE, and both know whether the feature has been enabled for the UE (block 614 of FIG. 6), there will be the same understanding from both sides on the legal PDCCH candidates for a given subframe.

Embodiments of the invention detailed above provide certain technical effects such as for example they make more efficient use of the UE's PDCCH blind detection capability, and they reduces the PDCCH blocking probability, which increases the system throughput. From the UE's point of view, these embodiments increase the DL throughput since they allow higher probability of scheduled PDSCH in the CC in that DL subframe. These embodiments utilize predefined parameters such as the TDD UL/DL configuration per CC, and the ON/OFF flag for a given UE so there is not a difficult implementation issue such as MAC signaling reliability. Redefinition the PDCCH search space does not change the DCI formats that a UE shall monitor, but only changes the number of blind detection candidates when needed or when possible. The physical layer processing of PDCCH detection does not have to be changed, but the only difference is that the same processing would be repeated more times than before.

Figure 7:
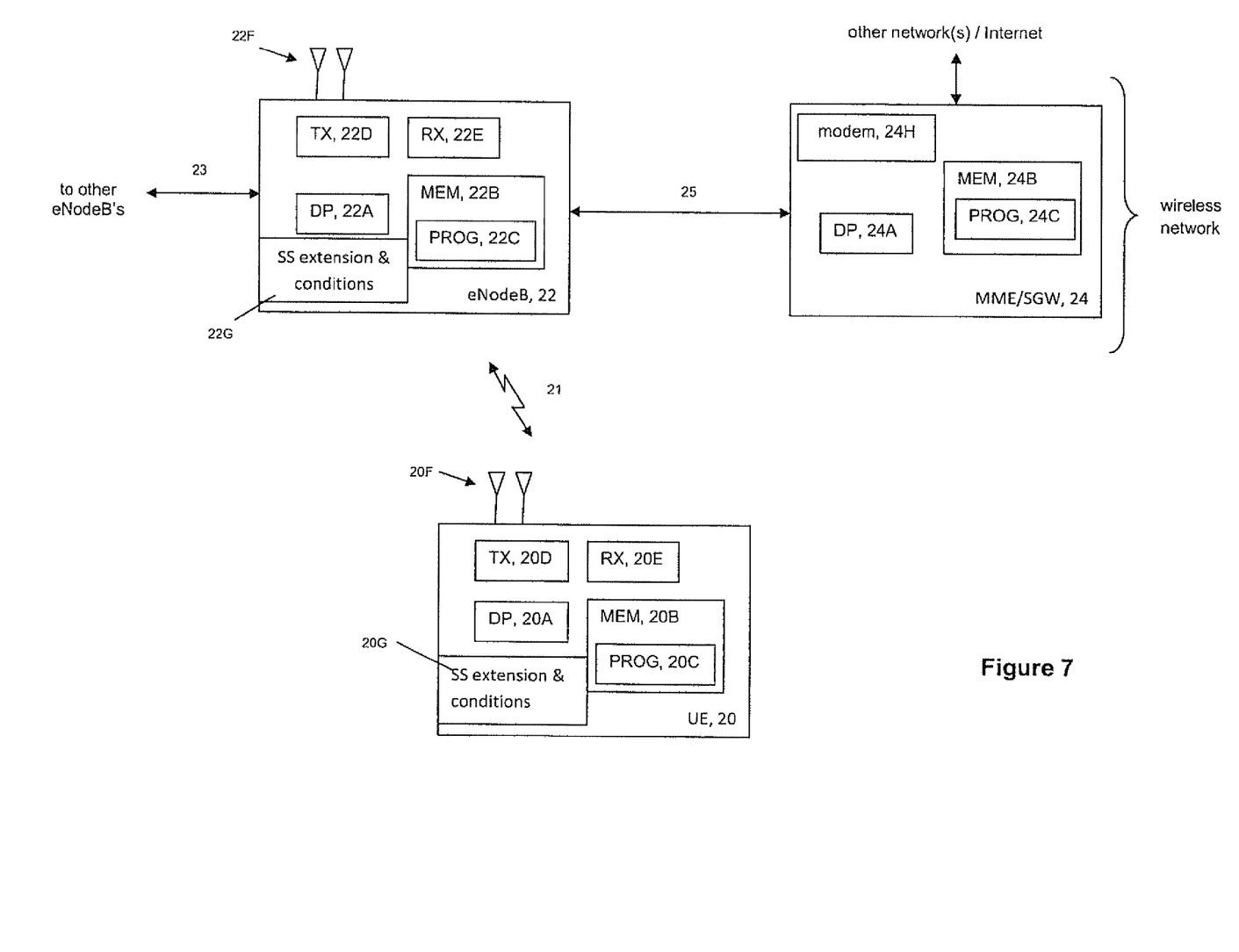
FIG. 7 is a simplified block diagram of a UE and an eNodeB which are exemplary electronic devices suitable for use in practicing the exemplary embodiments of the invention.

Reference is now made to FIG. 7 for illustrating a simplified block diagram of various electronic devices and apparatus that are suitable for use in practicing the exemplary embodiments of this invention. In FIG. 7 an eNodeB 22 is adapted for communication over a wireless link 21 with an apparatus, such as a mobile terminal or UE 20. The eNodeB 22 may be any access node (including frequency selective repeaters) of any wireless network such as LTE, LTE-A, GSM, GERAN, WCDMA, and the like. The operator network of which the eNodeB 22 is a part may also include a network control element such as a mobility management entity MME and/or serving gateway SGW 24 or radio network controller RNC which provides connectivity with further networks (e.g., a publicly switched telephone network and/or a data communications network/Internet).

The UE 20 includes processing means such as at least one data processor (DP) 20A, storing means such as at least one computer-readable memory (MEM) 20B storing at least one computer program (PROG) 20C or other set of executable instructions, communicating means such as a transmitter TX 20D and a receiver RX 20E for bidirectional wireless communications with the eNodeB 22 via one or more antennas 20F. Also stored in the MEM 20B at reference number 20G are the rules for how to define the second search space and the predetermined conditions for when to do so as detailed above in the various exemplary embodiments.

The eNodeB 22 also includes processing means such as at least one data processor (DP) 22A, storing means such as at least one computer-readable memory (MEM) 22B storing at least one computer program (PROG) 22C or other set of executable instructions, and communicating means such as a transmitter TX 22D and a receiver RX 22E for bidirectional wireless communications with the UE 20 via one or more antennas 22F. The eNodeB 22 stores at block 22G similar rules for defining the second search space and the predetermined conditions for when to do so as set forth in the various exemplary embodiments above.

While not particularly illustrated for the UE 20 or eNodeB 22, those devices are also assumed to include as part of their wireless communicating means a modem and/or a chipset which may or may not be inbuilt onto an RF front end chip within those devices 20, 22 and which also operates utilizing the rules and predetermined conditions concerning the second search space according to these teachings.

At least one of the PROGs 20C in the UE 20 is assumed to include a set of program instructions that, when executed by the associated DP 20A, enable the device to operate in accordance with the exemplary embodiments of this invention, as detailed above. The eNodeB 22 also has software stored in its MEM 22B to implement certain aspects of these teachings. In these regards the exemplary embodiments of this invention may be implemented at least in part by computer software stored on the MEM 20B, 22B which is executable by the DP 20A of the UE 20 and/or by the DP 22A of the eNodeB 22, or by hardware, or by a combination of tangibly stored software and hardware (and tangibly stored firmware). Electronic devices implementing these aspects of the invention need not be the entire devices as depicted at FIG. 7 or may be one or more components of same such as the above described tangibly stored software, hardware, firmware and DP, or a system on a chip SOC or an application specific integrated circuit ASIC.

In general, the various embodiments of the UE 20 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEMs 20B, 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the LTE and LTE-A system, as noted above the exemplary embodiments of this invention may be used with various other CA-type wireless communication systems.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus for user equipment, comprising:
   circuitry configured to:
   determine whether a number X of blind detections for the user equipment in one of a radio frame or subframe is less than a threshold Z when the user equipment uses a first search space; and
   control the user equipment to use, when the number X of blind detections is less than the threshold Z, a second search space such that a number Y of blind detections for the user equipment in the one of the radio frame or subframe is greater than the number X of blind detections, the second search space defined by determining, for each of a series of ordered downlink control information (DCI) formats, a number of blind detections by increasing the number of blind detections for a previous DCI format of the series of ordered DCI formats until the number Y of blind detections is nearest to but not greater than the threshold Z, wherein,
   each of the number X, the number Y and the threshold Z are positive integers.

2. The apparatus according to claim 1, wherein the threshold Z is a maximum number M of blind detections defined by at least one of:
   an uplink or downlink transmission mode for a component carrier including the one of the radio frame or subframe; and
   a number of component carriers configured for the user equipment.

3. The apparatus according to claim 1, wherein
   the user equipment is configured with at least a first and a second component carrier, and
   the circuitry is further configured to determine whether the one of the radio frame or subframe satisfies any of the following:
   the one of the radio frame or subframe is uplink in the first component carrier and downlink in the second component carrier;
   the one of the radio frame or subframe is a special subframe and in the first but not the second component carrier the special subframe does not allow a downlink shared channel or does not allow releasing semi-persistent scheduling; and
   the one of the radio frame or subframe is an almost blank subframe and in the first but not the second component carrier.

4. The apparatus according to claim 1, wherein the increasing the number of blind detections for the previous DCI format of the series comprises doubling the number of blind detections for the previous DCI format of the series.

5. The apparatus according to claims 1, wherein the series of ordered DCI formats includes separately different aggregation levels per DCI format.

6. The apparatus according to claim 1, further comprising the user equipment, wherein
   the circuitry determines whether the number X of blind detections is less than the threshold Z according to the user equipment reporting to a network access node that it supports utilizing the second search space, and
   the user equipment is configured to receive signaling from the network access node for redefining the first search space.

7. The apparatus according to claim 1, wherein
   the circuitry is further configured to determine whether the one of the radio frame or subframe is identified as being subject to the second search space in a bitmap of subframes of multiple component carriers configured for the user equipment, and
   the bitmap is received from a network access node.

8. The apparatus according to claim 1, wherein
   the number Y of blind detections is equal to a sum of the number of blind detections for each of the series of ordered DCI formats, and
   the circuitry determines, for each DCI format, the number of blind detections to be equal to twice the number of blind detections of the previous DCI format, until the number Y of blind detections is nearest to but not greater than the threshold Z.

9. The apparatus according to claim 1, wherein the circuitry receives information defining the series of ordered DCI formats.

10. A method, comprising:
    determining, by circuitry of user equipment, whether a number X of blind detections for the user equipment in one of a radio frame or subframe is less than a threshold Z when the user equipment uses a first search space; and
    controlling, by the circuitry, the user equipment to use, when the number X of blind detections is less than the threshold Z, a second search space such that a number Y of blind detections for the user equipment in the one of the radio frame or subframe is greater than the number X of blind detections, the second search space defined by determining, for each of a series of ordered downlink control information (DCI) formats, a number of blind detections by increasing the number of blind detections for a previous DCI format of the series of ordered DCI formats until the number Y of blind detections is nearest to but not greater than the threshold Z, wherein
    each of the number X, the number Y and the threshold Z are positive integers.

11. The method according to claim 10, wherein the threshold Z is a maximum number M of blind detections defined by at least one of:
an uplink or downlink transmission mode for a component carrier including the one of the radio frame or subframes; and
a number of component carriers configured for the user equipment.

12. The method according to claim 10, wherein
the user equipment is configured with at least a first and a second component carrier, and
the method further comprises determining, by the circuitry, whether the one of the radio frame or subframe satisfies any of the following:
the one of the radio frame or subframe is uplink in the first component carrier and downlink in the second component carrier;
the one of the radio frame or subframe is a special subframe and in the first but not the second component carrier the special subframe does not allow a downlink shared channel or does not allow releasing semi-persistent scheduling; and
the one of the radio frame or subframe is an almost blank subframe and in the first but not the second component carrier.

13. The method according to claim 10, wherein the increasing the number of blind detections for the previous DCI format of the series comprises doubling the number of blind detections for the previous DCI format of the series.

14. The method according to claim 10, wherein the series of ordered DCI formats includes separately different aggregation levels per DCI format.

15. The method according to claim 10, further comprising:
determining, by the circuitry, whether the number X of blind detections is less than the threshold Z according to the user equipment reporting to a network access node that it supports utilizing the second search space, wherein
the user equipment is configured to receive signaling from the network access node for redefining he first search space.

16. The method according to claim 10, further comprising:
determining, by the circuitry, whether the one of the radio frame or subframe is identified as being subject to the second search space in a bitmap of subframes of multiple component carriers configured for the user equipment, wherein
the bitmap is received from a network access node.

17. The method according to claim 10, wherein
the number Y of blind detections is equal to a sum of the number of blind detections for each of the series of ordered DCI formats, and
the determining includes determining, by the circuitry for each DCI format, the number of blind detections to be equal to twice the number of blind detections of the previous DCI format, until the number Y of blind detections is nearest to but not greater than the threshold Z.

18. The method according to claim 10, further comprising receiving, by the circuitry, information defining the series of ordered DCI formats.

19. A non-transitory computer readable memory storing a set of instructions, which when executed by circuitry of an apparatus, causes the apparatus to:
determine whether a number X of blind detections for a user equipment in one of a radio frame or subframe is less than a threshold Z when the user equipment uses a first search space; and
control the user equipment to use, when the number X of blind detections is less than the threshold Z, a second search space such that a number Y of blind detections for the user equipment in the one of the radio frame or subframe is greater than the number X of blind detections, the second search space defined by determining, for each of a series of ordered downlink control information (DCI) formats, a number of blind detections by increasing the number of blind detections for a previous DCI format of the series of ordered DCI formats until the number Y of blind detections is nearest to but not greater than the threshold Z, wherein
each of the number X, the number Y and the threshold Z are positive integers.

20. The non-transitory computer readable memory according to claim 19, wherein
the user equipment is configured with at least a first and a second component carrier, and
the apparatus is caused to determine whether the one of the radio frame or subframe satisfies any of the following:
the one of the radio frame or subframe is uplink in the first component carrier and downlink in the second component carrier;
the one of the radio frame or subframe is a special subframe and in the first but not the second component carrier the special subframe does not allow a downlink shared channel or does not allow releasing semi-persistent scheduling; and
the one of the radio frame or subframe is an almost blank subframe and in the first but not the second component carrier.

* * * * *